United States Patent
Ghosh et al.

(10) Patent No.: US 12,044,118 B2
(45) Date of Patent: *Jul. 23, 2024

(54) SENSOR ELEMENTS AND ASSEMBLIES, CUTTING TOOLS COMPRISING SAME AND METHODS OF USING SAME

(71) Applicant: ELEMENT SIX (UK) LIMITED, Didcot (GB)

(72) Inventors: Santonu Ghosh, Didcot (GB); Christopher John Howard Wort, Didcot (GB); Vijay Nadasen Vythilingum, Didcot (GB)

(73) Assignee: Element Six (UK) Limited, Didcot (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/773,506

(22) PCT Filed: Nov. 3, 2020

(86) PCT No.: PCT/EP2020/080842
§ 371 (c)(1),
(2) Date: Apr. 29, 2022

(87) PCT Pub. No.: WO2021/089564
PCT Pub. Date: May 14, 2021

(65) Prior Publication Data
US 2023/0003120 A1    Jan. 5, 2023

(30) Foreign Application Priority Data
Nov. 4, 2019   (GB) ...................................... 1916000

(51) Int. Cl.
*E21B 47/01*   (2012.01)
*E21B 10/46*   (2006.01)
(Continued)

(52) U.S. Cl.
CPC ............ *E21B 47/013* (2020.05); *E21B 10/46* (2013.01); *E21B 10/52* (2013.01); *E21B 10/56* (2013.01);
(Continued)

(58) Field of Classification Search
CPC .... E21B 49/003; E21B 10/567; E21B 47/013; E21B 47/13; E21B 10/46; E21B 10/52; E21B 10/56; G01K 7/01; G01N 27/041
See application file for complete search history.

(56) References Cited

U.S. PATENT DOCUMENTS 3,455,158 A * 7/1969 Richter, Jr. ............. E21B 12/02
175/39
8,695,729 B2   4/2014 Kumar et al.
(Continued)

FOREIGN PATENT DOCUMENTS

WO        2013155287 A    10/2013

OTHER PUBLICATIONS

United Kingdom Patent Application No. GB1916000.1, Combined Search and Examination Report dated Feb. 27, 2020, 10 pages.
(Continued)

*Primary Examiner* — Brad Harcourt
(74) *Attorney, Agent, or Firm* — Kilpatrick Townsend & Stockton LLP

(57) ABSTRACT

A sensor element for a cutting tool has a hard portion having a first sensing surface, first and second electrodes, and first and second sets of thermocouple wires, and an electrically insulating portion. The second electrode has a second sensing surface. The hard portion comprises hard and/or super-hard material and the first and second electrodes comprise electrically conductive hard and/or super-hard material, the hard portion isolating the first sensing surface from the second sensing surface. The second electrode is attached to
(Continued)

or forms part of an electrically conductive region of the hard portion or a region attached thereto. Electric current flows between the first and second electrodes through external material when the sensing surfaces contact the material in response to the cutting tool engaging the material. The first and second electrodes are operable to indicate any one or more of a temperature of the first and second electrodes, and conductivity between the electrodes.

19 Claims, 5 Drawing Sheets

(51) Int. Cl.
| | | |
|---|---|---|
| | *E21B 10/52* | (2006.01) |
| | *E21B 10/56* | (2006.01) |
| | *E21B 10/567* | (2006.01) |
| | *E21B 47/013* | (2012.01) |
| | *E21B 49/00* | (2006.01) |
| | *G01K 7/01* | (2006.01) |
| | *G01N 27/04* | (2006.01) |

(52) U.S. Cl.
CPC .......... *E21B 10/567* (2013.01); *E21B 49/003* (2013.01); *G01K 7/01* (2013.01); *G01N 27/041* (2013.01)

(56) References Cited

U.S. PATENT DOCUMENTS

| | | | |
|---|---|---|---|
| 11,180,989 B2 * | 11/2021 | Cao | B22F 7/06 |
| 2011/0266055 A1 | 11/2011 | DiGiovanni et al. | |
| 2012/0325564 A1 | 12/2012 | Vaughn et al. | |
| 2015/0314420 A1 * | 11/2015 | Can | E21B 10/567 51/307 |
| 2018/0320513 A1 | 11/2018 | Scott et al. | |
| 2018/0371845 A1 * | 12/2018 | Jiang | C23C 14/18 |

OTHER PUBLICATIONS

United Kingdom Patent Application No. GB2017416.5, Combined Search and Examination Report dated Jan. 13, 2021, 7 pages.
International Patent Application No. PCT/EP2020/080842, International Search Report and Written Opinion dated Dec. 10, 2021, 15 pages.

* cited by examiner

SENSOR ELEMENTS AND ASSEMBLIES, CUTTING TOOLS COMPRISING SAME AND METHODS OF USING SAME

FIELD

This disclosure relates generally to sensor elements and assemblies for mounting on cutting tools, for measuring an electrical characteristic of material generated during a cutting process, and to methods of using the sensor elements and assemblies.

BACKGROUND

Super-hard material such as polycrystalline diamond (PCD) and polycrystalline cubic boron nitride (PCBN) material is used in a wide variety of tools for cutting, machining, drilling or degrading hard or abrasive materials such as rock, metal, ceramics, composites and wood-containing materials. Super-hard cutter elements used in industrial tools or in rock-boring bits, for example, may be exposed in use to high temperatures, as well as to highly abrasive or erosive conditions. This makes it challenging to measure local cutting conditions or to gain information about material being cut, or material generated by the cutting process.

For example, drill bits used for boring into the earth for oil or gas exploration include arrays of PCD cutter elements, which are driven against rock deep beneath the earth's surface to cut through rock formations. In such operations, a bit may need to bore through several types of geological formations and an operator may wish to have an indication of the formation currently being bored.

There is a need for operators of cutting tools to gain insight into certain characteristics of workpiece material being cut. In particular, but not exclusively, operators of earth-boring bits may benefit from having near real-time indication of characteristics of rock in a formation being drilled.

SUMMARY

Viewed from a first aspect, there is provided a sensor element for a cutting tool, comprising: a hard portion, having a first sensing surface; a first electrode; a first set of thermocouple wires; a second electrode having a second sensing surface; a second set of thermocouple wires; and an electrically insulating portion; wherein: the hard portion comprises hard and/or super-hard material; the first electrode and the second electrode each comprising electrically conductive hard and/or super-hard material, the first electrode being attached to the hard portion and exposed at a first respective area of the first sensing surface; the hard portion including the electrically insulating portion to isolate the first sensing surface from the second sensing surface; the second electrode being attached to or forming part of an electrically conductive region of the hard portion or a further region attached thereto; the first electrode, the second electrode and the hard portion being arranged to allow an electric current to flow between with first electrode and the second electrode through external material, when the sensing surfaces contact the external material in response to the cutting tool engaging the external material in use; wherein the first set of thermocouple wires are electrically connected to the first electrode at a first thermocouple junction, and the second set of thermocouple wires are connected to the second electrode at a thermocouple junction; and the second set of thermocouple wires are connected to the second electrode at a further thermocouple junction; and the first and second electrodes being operable to indicate any one or more of a temperature of the first electrode and a temperature of the second electrode, and the conductivity between the first and second electrodes.

Viewed from a second aspect, there is provided a sensor assembly comprising an example disclosed sensor element; a source of potential difference and electric current; a current measurement device; voltage measurement means connected to the first and second sets of thermocouple wires, operable to indicate the temperatures of the first and second electrodes; the first electrode, the second electrode, the source and the current measurement device connected in an electrical circuit, arranged to generate a potential difference between the first electrode and the second electrode, and to allow an electric current to flow between the first electrode and the second electrode, through external material when the sensing surface contacts the external material in response to the cutting tool engaging the external material in use; and to allow the current measurement device to indicate the magnitude of the electric current, a source of potential difference and electric current; a current measurement device; voltage measurement means connected to the first and second thermocouple junctions, operable to indicate the temperatures of the first and the second electrode; the first electrode, the second electrode, the source and the current measurement device connected in an electrical circuit, arranged to generate a potential difference between the first electrode and the second electrodes, and to allow an electric current to flow between the first electrode and the second electrode, when the sensing surface contacts the external material, in response to the cutting tool engaging the external material in use; and to allow the current measurement device to indicate the magnitude of the electric current.

Viewed from a third aspect, there is provided a cutting tool, comprising a tool body and an example disclosed sensor element, attached to the tool body; operable to contact the sensing surface with external material when the cutting tool engages the external material in use.

Viewed from a fourth aspect, there is provided a method of using an example disclosed cutting tool, including engaging a workpiece body with the cutting tool to remove workpiece material from the workpiece body, and allowing the sensing surfaces of the sensor element to engage external material containing workpiece material cut from the workpiece body; generating a potential difference between the first electrode and the second electrode; generating an electric current to flow between the first electrode and the second electrode, through the external material contacted by the sensing surface; measuring the electric current; measuring the temperatures of the first electrode and the second electrode; determining the respective electrical resistance of the first electrode and the second electrode at the respective measured temperatures; and analysing the measured electric current to determine an electrical characteristic of the external material.

Various example methods and systems are envisaged by this disclosure, of which various non-limiting, non-exhaustive examples and variations are described as follows.

In some example arrangements, the first and/or the second electrode may comprise electrically conductive super-hard material. For example, the first electrode and/or the second electrode (and/or optionally one or more additional electrodes) may comprise or consist essentially of boron- or phosphorus-doped diamond, such as diamond manufactured by a chemical vapour deposition method.

In some examples, first and second electrodes may be coterminous with the sensing surface, spaced apart by a gap distance on the sensing surface. One or both of the first and second electrodes may protrude from the sensing surface; and/or may be substantially coplanar with an adjacent area of the sensing surface; and/or may be recessed from the sensing surface (that is, the exposed area of at least one of the electrodes may be recessed from the sensing surface).

In some example arrangements, the hard portion may comprise super-hard material such as single crystal diamond, polycrystalline diamond material, polycrystalline cubic boron nitride material, chemical vapour deposited diamond.

In some example arrangements, the sensor element may be configured as a cutter element; the first sensing surface may comprise a working surface of the cutter element and may include a cutting edge and include a rake face area. For example, the sensor element may be implemented as a cutter element for an earth-boring bit, or a machine tool for machining a workpiece. An example sensor element may comprise a substrate portion a comprising cemented carbide material such as cemented tungsten carbide or other hard-metal material, in which the hard portion such as a volume of PCD (polycrystalline diamond) material is joined to the substrate at an interface boundary. The interface boundary may be substantially planar or non-planar. A metal network may extend through one or other or both of the substrate portion and the hard portion which may comprise the binder material binding the grains of hard material therein and may comprise, for example, cobalt, nickel or another Group VIII material. In some examples, one or other of the hard portion or the substrate portion may comprise multiple layers bonded thereto.

In some example arrangements, the electrically insulating portion may comprise a volume of the hard material portion coterminous with the sensing surface. For example, the hard material portion may comprise polycrystalline diamond (PCD) material and include a surface volume that includes no more than about 2 wt. % metallic material. In some examples, the hard portion may comprise a first PCD volume that is electrically insulating and a second portion that may be electrically conducting, in which the first PCD volume may be coterminous with the sensing surface and extend a depth of about 100 microns to at least about 500 microns from the sensing surface; and the second PCD volume may extend from an interface boundary with the first PCD volume and a boundary of the hard portion, opposite the sensing surface. The first PCD volume may contain substantially no extending contiguous metallic portions, and/or less than about 2 wt. % metal (in electrically conducting form, such as elemental metal).

In some example arrangements, the first electrode may be electrically connected to the source by the first set of thermocouple wires; and/or the second electrode may be electrically connected to the source by the second set of thermocouple wires. In other words, the first and/or the second set(s) of thermocouples may be operable to convey electric current between the source and one or both of the first and second electrodes, as well as electrically connected (in parallel) to voltage measurement devices, operable to measure the temperature at one or both electrodes.

In some example arrangements, the sensor assembly may include a computer system, communicatively connected to the current measurement device, to receive measured electric current data from the current measurement device, the computer system configured to process the electric current data, to determine an electrical characteristic of the external material. In some example arrangements, the sensor assembly may include an impedance spectrometry system, operable to process a measured electric current having one or more frequency component. The source of the electric current may be configurable to generate varying electric current, having one or more frequency component, which may allow impedance and/or dielectric and/or other electrical characteristics of external material contacting the sensing surface to be estimated.

In some example arrangements, a cutting tool comprising an example sensor element may be provided as an earth boring bit, in which a plurality of cutter elements may be attached to the earth-boring bit, operable to cut rock and bore a hole into the earth; the sensor element arranged on the earth-boring bit to allow the sensing surface of the sensor element which may comprise a working surface of the cutter element to contact rock being cut and/or to contact swarf material generated by an earth-boring operation, in which the swarf material may include chips of the rock.

In some example arrangements, a method of using an example sensor assembly may include a computer-implemented method to process the measured electric current to calculate the electrical characteristic of the external material; and to calculate a quantity indicative of a mechanical characteristic of the workpiece material, based on the electrical characteristic.

Non-limiting example methods and systems will be described with reference to the appended drawings, of which:

Figure 4:
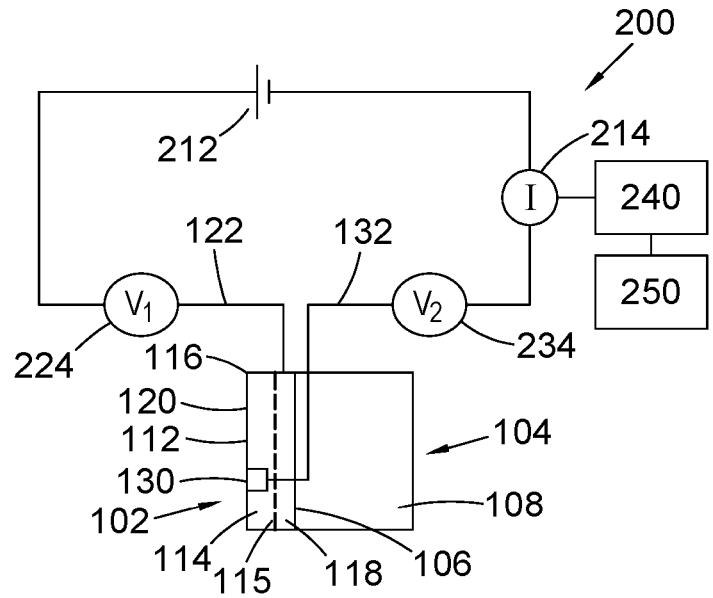
FIGS. 4 and 5 show schematic example sensor assemblies having different configurations, both including cross-section views of example sensor elements.
Figure 5:
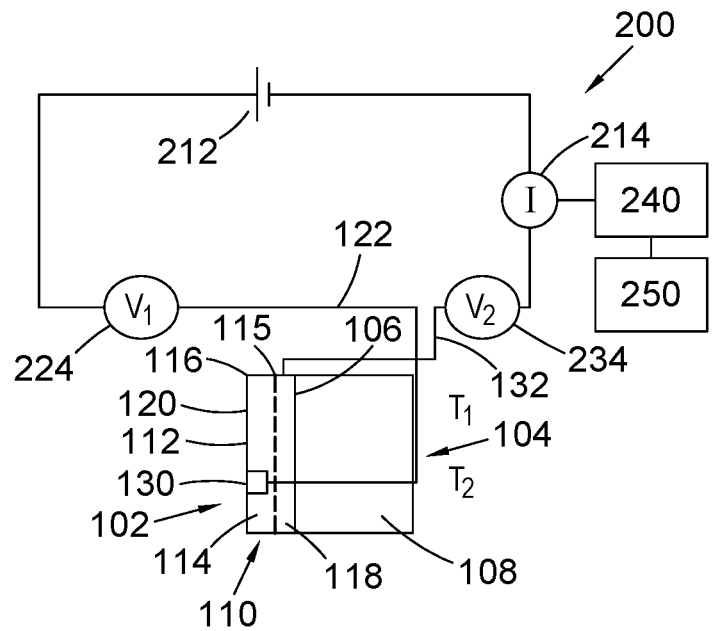
Figure 6:
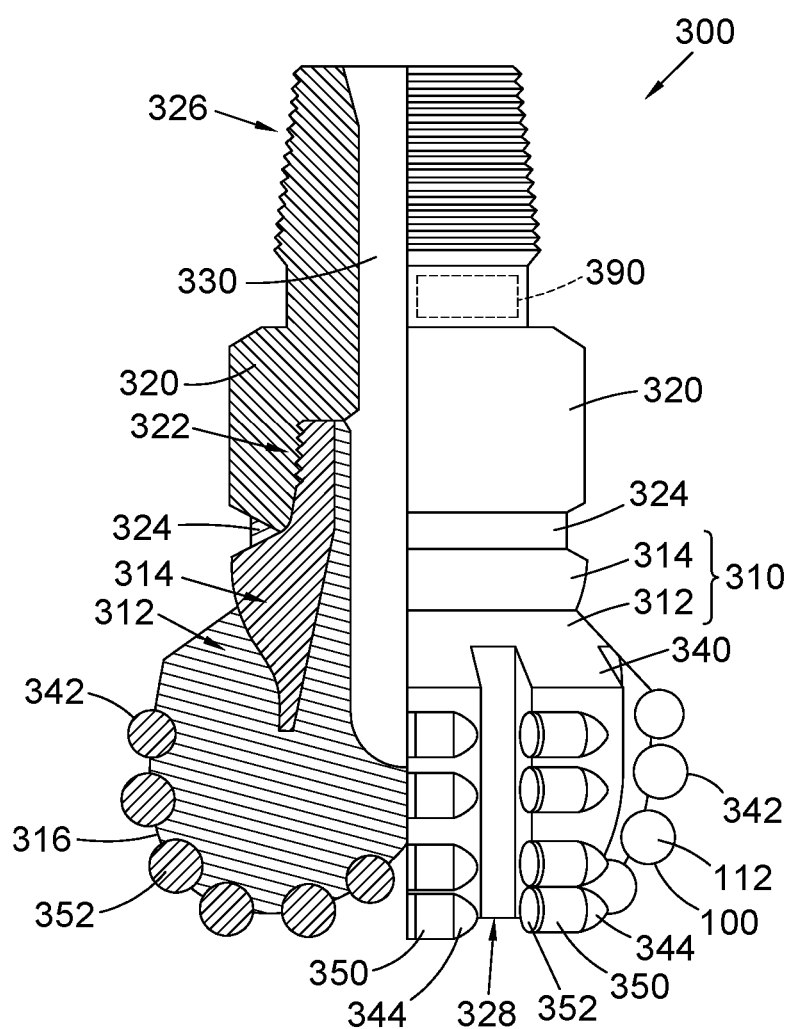
FIG. 6 shows a schematic partly perspective and partly cut-away views of an example earth-boring bit, including a sensor element configured as a cutting element mounted on the bit.

With reference to FIGS. 1 to 7, example sensor elements 100 may be configured as cutter elements 100 for an earth-boring bit (300 as shown in FIG. 6). An example sensor element 100 may have a proximal end 102 and a distal end 104, connected by a substantially cylindrical side 103. The sensor elements 100 may comprise a hard portion 110 (shown in FIG. 1 as having a mean thickness T1) joined to a substrate portion 108, in which the hard portion 110 may comprise polycrystalline diamond (PCD) material and the substrate portion 108 may comprise cobalt-cemented tungsten carbide (Co—WC) material, joined to the hard portion 110 at an interface boundary 106. The hard portion 110 has a sensing surface 112, a major area of which is coterminous with the proximal end 102, opposite the interface boundary 106, the sensing surface when the sensing element is arranged to be a cutting element comprising a working surface 112 of the cutting element including a circumferential cutting edge 116 coterminous with a chamfer area 117. The sensing or working surface 112 may extend over all or part of the proximal end 102 and, in some examples, along all or part of the side 103 of the sensor element 100.

In the illustrated examples, the PCD material comprised in the hard portion 110 may include a first PCD volume 114 and a second PCD volume 118. The first PCD volume 114 may be electrically insulating and the second PCD volume 118 may be electrically conducting and include cobalt. The second PCD volume 118 may be coterminous with the interface boundary 106 with the substrate portion 108, located remotely from the sensing or working surface 112, while the first PCD volume 114 is coterminous with the sensing or working surface 112 and may extend to a boundary 115 with the second PCD volume 118. The hard portion 110 may have a thickness T1 of about 2 mm to about 3 mm, from the sensing or working surface 112 to the interface boundary 106; and the first PCD volume 114 may have a mean thickness T2 of about 100 microns to about 500 microns, from the sensing or working surface 112 to an interface boundary 115 with the second PCD volume 118.

Figure 1:
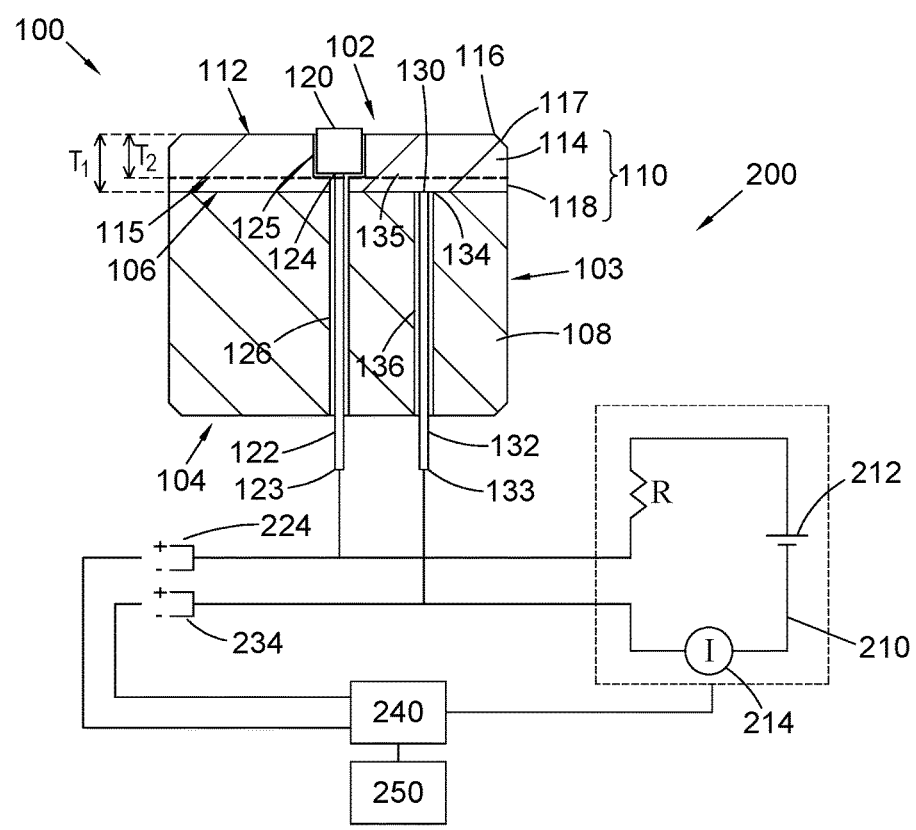
FIG. 1 shows a schematic drawing of an example sensor assembly, including a cross-section view through an example sensor element.

PCD material comprises an aggregated plurality of directly inter-grown diamond grains and a plurality of interstitial regions between diamond grains (not visible in FIG. 1). The interstitial regions in the second PCD volume 118 may be filled with filler material such as residual catalyst/binder, for example cobalt, which may have infiltrated from the substrate portion 108 during the process of sintering the diamond grains against the substrate portion 108. A substantial portion of the cobalt (and/or other electrically conducting material) that had been present in the first PCD volume 114 may be removed from the interstitial regions by treating the first PCD volume in acid, to leach out metallic material. The first PCD volume 114 may include interstitial voids and less than about 2 wt. % of cobalt, or substantially no cobalt. Consequently, the first PCD volume 114 is an electrically insulating portion 114 and the second PCD volume 118 may be electrically conducting.

A first electrode 120 is brazed into a pocket 125 provided in the first PCD volume 114, the surface area of the first electrode 120 protruding from the sensing or working surface 112. The first electrode 120 may comprise electrically semiconducting boron-doped diamond, which may be manufactured using a chemical vapour deposition method. The first electrode 120 may be substantially cylindrical in shape, having an axial length of about 0.1 mm to about 2 mm (for example, about 0.5 mm) and a diameter of about 0.5 mm to about 5 mm (for example, about 2 mm). A wide range of shapes and arrangements of the first electrode 120 are envisaged, including cubic, rhombohedral, prismatic and polygonal shapes. In some examples, an exposed surface of the electrode 120 may be substantially coplanar with an adjacent area of the sensing or working surface 112 or may be recessed from the sensing or working surface 112. In some examples, a sensor element 100 may have more than two electrodes, for example, four electrodes.

In the examples shown in FIGS. 1, 2, 4, 5 and 7, the second PCD volume 118 in which residual metal catalyst/binder resides acts as a second electrode 130.

As the first PCD volume 114 is electrically insulating, the first and second electrodes 120, 130 are electrically isolated from each other.

In general, the first PCD volume 114 may be sufficiently thick to avoid dielectric breakdown at the potential difference between the first and second electrodes 120, 130 when in use.

In the examples of FIGS. 1, 4, 5 and 7, respective through-holes 126, 136 may extend from the bottom of the pocket 125, and second PCD volume 118 to the distal end 104, each through-hole 126, 136 housing respective first and second pairs thermocouple wires 122, 132. A respective proximal end of each pair of the thermocouple wires 122, 132 is brazed to a respective one of the first and second electrodes 120, 130, to provide a respective thermocouple junction 124, 134 at the respective electrode 120, 130. The first and second pairs of thermocouple wires 122, 132 are housed within respective electrically insulating sheaths, to electrically isolate them from the hard portion 110 and from the substrate portion 108. Respective distal ends 123, 133 of each pair of thermocouple wires 122, 132 may extend beyond the distal end 104 of the sensor element 100, or be guided by the through-holes 126, 136 to emerge from a side of the sensor element 100. Each pair of thermocouple wires 122, 132 thus provides a respective electrically conducting connection between the respective first and second electrodes 120, 130 and distal ends 123, 133 of the thermocouple wires 122, 132, which may have terminals (not shown) for connecting the thermocouple wires 122, 132 to voltage measurement devices 224, 234.

The respective distal ends 123, 133 of the first and second pairs of thermocouple wires 122, 132 are electrically connected to respective voltmeters 224, 234, to allow the temperatures at the first and second thermocouple junctions 124, 134 at the first and second electrodes 120, 130 to be measured. Each pair of the thermocouple wires 122, 132 may also be electrically connected to respective opposite poles of a battery 212 in an electric circuit 210, thus establishing a potential difference between the first and second electrodes 120, 130. The battery 210 can also supply an electric current, which can be measured by an ammeter 214 connected in series in the circuit 210. The circuit 210 may include a resistive load R.

The example sensor assemblies illustrated in FIGS. 4 and 5 show alternative configurations of the pairs of thermocouple wires 122, 132 in relation to the hard portion 110 and the substrate portion 108. In the example sensor assembly 200 shown in FIG. 4, proximal ends of the of the first pair 122 of thermocouple wires (at the first thermocouple junction 124) are brazed to a side area of the first electrode 120. The first pair of thermocouple wires 122 may pass through a through-hole in the first PCD volume 114, the distal ends 123 protruding from a side of the first PCD volume 114. Proximal ends of the second pair 122 of thermocouple wires (at the second thermocouple junction 134) are brazed to a base area of the second electrode 130, opposite an area exposed at the sensing or working surface 112. The second pair of thermocouple wires 132 may extend through the first PCD volume 114, the second PCD volume 118 and into the substrate portion 108, across the interface boundary 106. The thermocouple wires of the second pair 132 may be bent at about 90°, or a different angle, and extend through a side of the substrate portion 108. In the sensor assembly 200 illustrated in FIG. 5, the respective proximal ends of each pair of thermocouple wires 122, 132 are brazed to respective base areas of each of the first and second electrodes 120, 130, at respective thermocouple junctions 124, 134, and extend within electrically insulating sheaths substantially perpendicular to the sensing or working surface 112, to protrude from the substrate portion 108 at the distal end 104.

Figure 2:
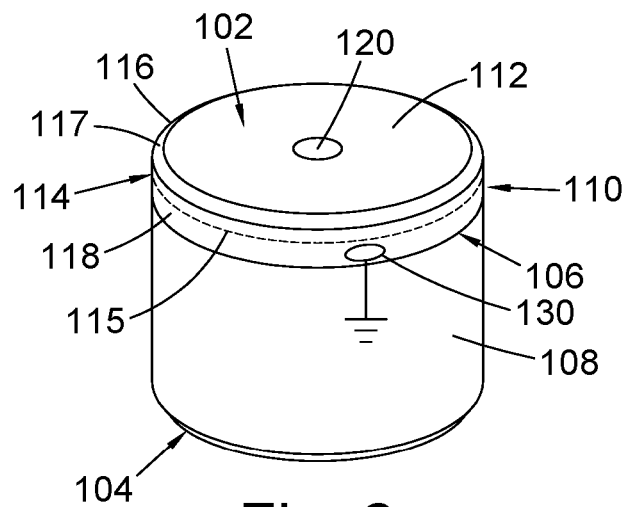
FIGS. 2 and 3 show schematic perspective views of example sensor elements.
Figure 3:
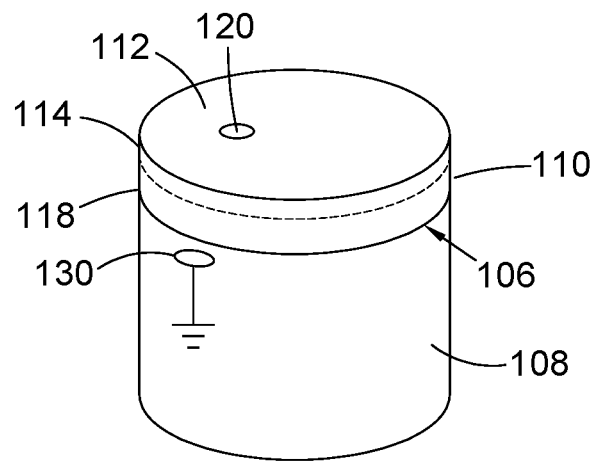

The examples of FIGS. 2 and 3 differ from those shown in FIGS. 1, 4, 5, and 7 in that, in the example of FIG. 2, the second PCD volume 118 forms a second electrode 130 that is grounded and in the example in FIG. 3 the substrate 108 forms a second electrode 130 that is grounded.

The example sensor assemblies 200 illustrated in FIGS. 1, 4, 5 and 7 include a computer system 240 and an impedance spectrometry device 250. The computer system 240 may be communicatively connected to voltmeters 224, 234 connected to the first and second pairs of thermocouple wires 122, 132, respectively, allowing the computer system 240 to receive voltage data indicative of the temperature of each electrode 120, 130. The computer system 240 may also be electrically connected to the electrical circuit 210, particularly the current measurement device 214, to receive data indicative of measured electric current. The computer system 240 may comprise an executable computer program, configured to process these data to determine the impedance of external material (410 in FIG. 7) electrically connecting the first and second electrodes 120, 130 to each other, when the sensor element 100 is in use. The computer program may have access to various other data, such as properties of various kinds of rock formations and other materials such as water and/or oil, as well as various relationships between measurable parameters. The impedance spectroscopy device 250 may be communicatively connected to the current measurement device 214 and/or to the computer system 240, operable to determine impedance and/or dielectric characteristics of external material connecting the electrodes 120, 130 when in use.

In the example sensor assemblies illustrated in FIGS. 2 and 3 a computer system may be communicatively connected to voltmeters connected to the first and second pairs of thermocouple wires 122, 132, respectively, allowing the computer system to receive voltage data indicative of the temperature of each electrode 120, 130. The computer system may also be electrically connected to a current measurement device to receive data indicative of measured electric current and thereby the conductivity between the first and second electrodes through the medium being drilled or cut in use. The computer system may comprise an executable computer program, configured to process these data to determine the impedance and/or conductivity of external material (410 in FIG. 7) electrically connecting the first and second electrodes 120, 130 to each other, when the sensor element is in use. The computer program may have access to various other data, such as properties of various kinds of rock formations and other materials such as water and/or oil, as well as various relationships between measurable parameters. An impedance spectroscopy device may be communicatively connected to a current measurement device and/or to the computer system, operable to determine impedance and/or dielectric characteristics of external material connecting the electrodes 120, 130 when in use.

An example method of using an example sensor assembly 200, mounted onto an example earth-boring bit 300, will be described with reference to FIGS. 1 to 7. With particular reference to FIG. 6, an example cutting tool 300 may comprise a fixed-cutter type of earth-boring bit 300, for use in oil and gas exploration, and an example sensor element 100 may be implemented as a cutter element 100 for the earth-boring bit 300. The earth-boring bit may comprise a bit body 310, including a crown 312 and a steel blank 314. The steel blank 314 may be partially embedded in the crown 312, which may be formed of tungsten carbide grains embedded in a copper alloy matrix material. The bit body 312 has a bit face 316 and a plurality of blades 340, arranged azimuthally about a longitudinal axis defined by a longitudinal bore 330 and spaced apart from each other by junk slots 328. The bit body 310 may be secured to a steel shank 320 by way of a threaded connection 322 and a weld 324, which extends around the drill bit 300 on an exterior surface, along an interface between the bit body 310 and the steel shank 320. The steel shank 320 may have a threaded connection portion 326 for attaching the drill bit 300 to a drill string (not shown), which may include a tubular pipe and segments coupled end to end between the earth-boring drill bit 300 and other drilling equipment at the surface of the earth. Internal fluid passageways (not shown) may extend between the bit face 316 and the longitudinal bore 330, which extends through a steel shank 320 and partially through the bit body 310. Nozzle inserts (not shown) may also be provided at the bit face 316 within the internal fluid passageways.

Each cutter element 350, 100 may have a substantially cylindrical shape and comprise a hard portion 110 formed of PCD and a substrate portion 108 formed of cobalt-cemented tungsten carbide attached to the hard portion 110, each hard portion 110 having a respective cutting surface or working 352, 112. A plurality of cutter elements 350, including the sensor element 100, may be attached at the bit face 316, in which a part of the substrate portion 108 of each cutter element 350, 100 may be brazed within a respective pocket 342 provided in the bit face 316. In some examples, the substrate portion 108 of a sensor element 100 may include an attachment portion adjacent the distal end 104, inserted into a pocket 342. Each cutter element 350, 100 may be supported from behind by a respective buttress 344, which may be integrally formed with the crown 312.

In some example arrangements, the earth-boring bit 300 may include a data collection module 390, to which the first and second pair of thermocouple wires 122, 132 may be electrically connected. The data collection module 390 may include components (not shown) such as an analogue-to-digital converter, a computer processor, executable software and other components for collecting and/or interpreting data generated by the sensor element 100 in use.

During drilling operations, the earth-boring bit 100 can be positioned at the bottom of a bore hole (not shown) such that the cutters 350, 100 are adjacent the earth formation 400 (in FIG. 7) to be drilled, and the earth-boring bit 300 is driven to rotate within the bore hole. As the earth-boring bit 300 is rotated, drilling fluid is pumped to the bit face 316 through the longitudinal bore 330 and the internal fluid passageways (not shown). Rotation of the drill bit 100 causes the cutters 350, 100 to scrape across and shear away material 410 at the surface of the underlying rock formation 400. Swarf 410 including chips (which may also be referred to as cuttings) of the rock formation 400 combined with, and/or suspended within, the drilling fluid is generated by the earth boring operation. As the earth-boring bit 300 rotates, the cutter elements 350, 100 can shear away material from the surface of the formation 400, generating a significant amount of heat and mechanical stress within the cutter elements 350, 100. The swarf 410 can pass through the junk slots 328 and an annular space (not shown) between the bore hole and the drill string and move to the surface of the earth.

Figure 7:
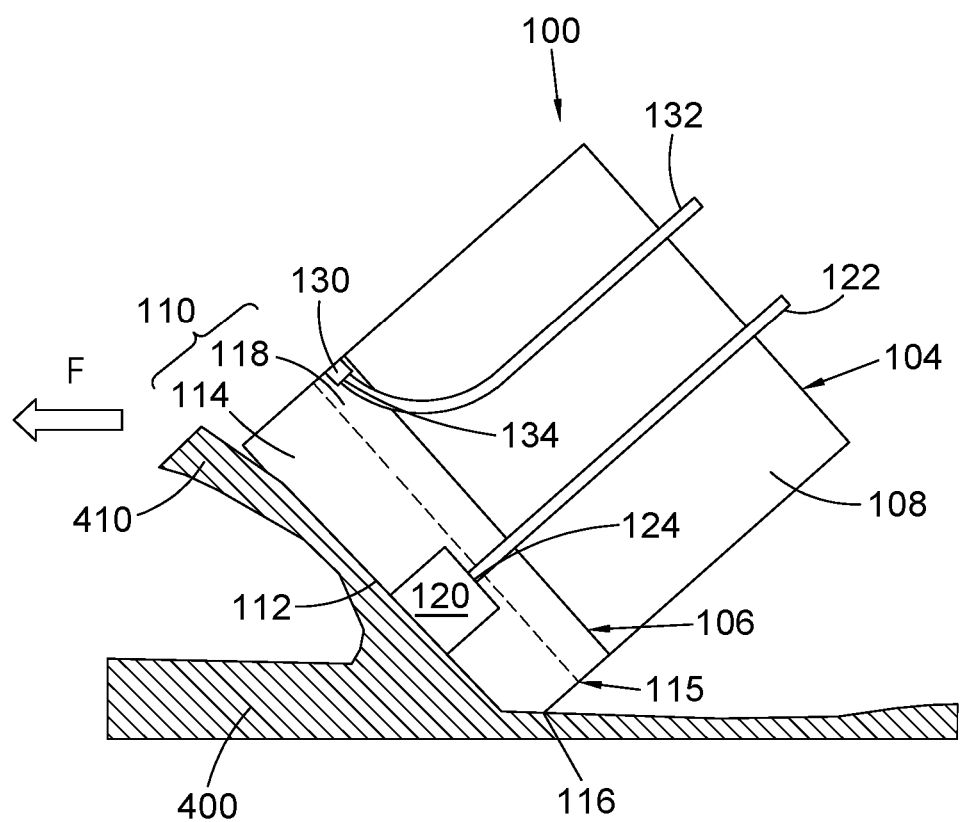
FIG. 7 shows a schematic drawing of an example sensor element configured as a cutter element for an earth-boring bit (not included), shown in cross-section and in use, cutting material from a rock formation.

FIG. 7 shows an example sensor element 100 implemented as a cutter element 100 for an earth-boring bit 300 (in FIG. 6), cutting material from an underlying rock formation 400 (the earth-boring bit is not shown in FIG. 7). The sensor element 100 is illustrated in cross-section, showing example first and second electrodes 120, 130 and respective pairs of thermocouple wires 122, 132 brazed onto or into each of the electrodes 120, 130 at respective thermocouple junctions 124, 134. The sensor element 100 comprises a PCD hard portion 110 and a substrate portion 108 comprising Co—WC material, the hard portion 110 and substrate portions 108 joined to each other at an interface boundary 106. The PCD hard portion 110 comprises an electrically insulating first PCD volume 114 that is coterminous with the sensing or working surface 112, and an electrically conducting second PCD volume 118 that is remote from the sensing or working surface 112. In some examples, the first electrode 120 may comprise boron-doped diamond and may be housed within a pocket in the first PCD volume 114.

With particular reference to FIGS. 1 to 5, when a sensor element 100 is not in use, the electrical circuit 210 will be open, since the first PCD volume 114 will electrically isolate the first and second electrodes 120, 130 from each other. As the earth boring bit 300 drives the example sensor element 100 in a direction F by the (in FIG. 7), a cutting edge 116 of the sensor element 100 cuts rock from the rock formation, generating swarf material 410 including one or more rock chip as well as water and/or oil. The swarf 410 may contact the sensing or working surface 112, at least an area of which functioning as a rake face 11, guiding the swarf away from the cutting edge 116. The PCD material comprised in the hard portion 110 will be highly resistant to abrasive or erosive wear by rock chips passing over the sensing or working surface 112. In addition, the diamond comprised in the first and second electrodes 120, 130 will also be highly wear resistant.

If the swarf 410 is sufficiently electrically conducting, then it can close the electrical circuit 210 by establishing an electrical pathway between the first and second electrodes 120, 130.

In the examples of FIGS. 1, 4 and 5, each pair of thermocouple wires 122, 132 is electrically connected to respective voltmeters (224, 234 in FIGS. 1, 4 and 5) and, in parallel, to opposite poles of the source (212 in FIGS. 1, 4 and 5) of potential difference and electric current. An electric current flowing through swarf 410 that electrically connects the first and second electrodes 120, 130, can be measured, providing an indication of certain electrical characteristics of the swarf 410 and potentially the underlying rock formation 400.

In general, and for example in all of the examples of FIGS. 1 to 7, the electrical resistance and/or dielectric impedance and/or other electrical properties of an electrode may depend on their temperature and/or on the compressive force applied to it. For example, the electrical resistivity of the boron-doped diamond forming the first electrode may change dependent on a compressive force applied to it. The resistivity of boron-doped diamond depends on the level of boron dopant concentration and the temperature. Boron-doped diamond also exhibits a piezoresistive response. Quantities indicative of certain electrical characteristics of the swarf 410 and the rock formation 400 may be estimated based on the measured electric current and potential difference, taking into account the respective temperatures of the first and second electrodes 120, 130, as measured by the respective pairs of thermocouple wires 122, 132 in one or more of the examples.

In some example arrangements, a plurality of electrical terminals may be connected to an electrode at different respective positions on the electrode 120, 130, which may allow estimation of the compressive stress of the electrode 120, 130 and, consequently, the load being applied to the electrode 120, 130, potentially allowing an operator to adjust the load being applied onto the earth-boring bit 300.

In some examples, the source (212 in FIGS. 1, 4 and 5) may generate a varying potential difference and/or the electric current, and the measured varying current may be analysed to estimate dielectric properties of the swarf 410. For example, the source may provide an electric current having one or more sinusoidal component, each having a respective frequency. Impedance characteristics of the swarf 410, and potentially the underlying rock formation 400, may be estimated based on characteristics of the electric current, taking into account the electrical resistance of the electrodes 120, 130, as known in the art of impedance spectroscopy. Other required parameters may be stored in a database (not shown), from which a computer program may access them. For example, a database may be provided, containing electrical characteristics of various types of rock formations and drilling fluids in various combinations. Data including swarf compositions, and/or workpiece or rock material, and/or potential difference between electrodes, and/or arrangement of the electrodes, and/or electrode temperatures may be stored in the database. A method of using an example sensor element 100 may include using the database to determine a suitable potential difference, to achieve a desired differentiation of certain electrical characteristics of the swarf 410 or other external material contacting the sensing or working surface 212.

In general, the electric current passed through the first and second electrodes 120, 130 may be steady or pulsed, as a time series. Pulsed current may allow impedance characteristics of the swarf 410 and/or the uncut workpiece 400 to be measured (using a method known in the art of impedance spectroscopy). A complex impedance may be measured (that is, a real and imaginary part of the impedance may be estimated from the measured data). This may allow greater differentiation between different swarf compositions, or workpiece materials. In addition, pulsed current may have the aspect of reducing the electrical power required. A decay period (for example, a half-life) of the magnitude of each current pulse, or when a steady current is switched off, may provide information about the external swarf and/or workpiece material.

In at least the examples of FIGS. 1, 4 and 5, the potential difference between the first and second electrodes 120, 130 in use will generate an electric field between them, extending through the external swarf material 410. The magnitude of the electric field within a volume of the external swarf and/or uncut workpiece material 410, 400 at a given distance from the sensing or working surface 112 will depend on the magnitude of the potential difference. In other words, the volume of electric field having a magnitude greater than a given magnitude within the external material 410, 400 will depend on the potential difference between the first and second electrodes 120, 130; the greater the potential difference, the greater will be the volume of the electric field extending into the external material 410, 400. The magnitude of the potential difference between the first and second electrodes 120, 130 may be sufficiently great for the electric field to penetrate into uncut rock 400, or another workpiece. This may allow a greater amount of useful information about the rock 400 or other kind of workpiece to be determined. The relationship between the magnitude of the potential difference and the penetration of electric field into the external material, be it swarf 410 and/or uncut material 400, may be experimentally calibrated, and/or calculated.

The temperature at a cutting edge 116 of the sensing or working surface 212 in contact with a formation or another workpiece 400 in use may be estimated by extrapolating from the temperatures of the first and second electrodes 120, 130. For example, a sensor element 100 implemented as a cutter element may develop a wear scar area (not illustrated), generated by wear in use, and the temperature of the sensor element 100 at the wear area may be estimated by extrapolating from the temperatures of the electrodes 120, 130.

Positioning an electrode 120, 130 too close to a cutting edge 116 of a sensor element 100 implemented as a cutter element may result in the electrode 120, 130 having a higher temperature when in use; and/or a wear scar may be formed in the electrode 120, 130 as the sensor element 100 wears in use (that is, the wear scar that will likely form at the cutting edge 116 may progress into the electrode 120, 130). In some example arrangements, the first and second electrodes 120, 130 may both be located sufficiently far away from the cutting edge 116 to avoid a wear scar progressing into either electrode 120, 130 in normal use.

Some example methods of using an example sensor element 100 may include determining a change in the material composition of rock 400 or other material 400 being cut. This information may be conveyed to an operator, to allow them to modify operating parameters dependent on characteristics of the workpiece material 400. For example, if the sensor element 100 is attached to an earth-boring bit 300, measurement of electrical characteristics of the rock 400, and/or of swarf 410 containing chips of rock, may indicate whether the earth-boring bit 300 is boring through an oil-containing formation 400. The indicated characteristics of the external material 410, 400 may change substantially when the earth-boring bit 300 moves from water-containing to oil-containing formation 400, or vice versa. The measurement may indicate a magnitude of porosity of the formation 400 and the load on the earth-boring bit 300 may be modified dependent on this information. The measurement may indirectly indicate the compressive strength, or other mechanical characteristic, of the formation 400.

An example method of making an example sensor element 100 configured as a cutter element for an earth-boring bit 300 will be briefly described.

A precursor body comprising a PCD portion joined to a cobalt-cemented tungsten carbide (Co—WC) substrate portion may be manufactured by means of an ultra-high pressure, high temperature (HPHT) process. An HPHT process may include placing an aggregation of diamond grains onto the Co—WC substrate, providing a pre-sinter assembly (not shown), and subjecting the pre-sinter assembly to a pressure of at least about 6 GPa and a temperature of at least about 1,250° C. In some example processes, the aggregation of diamond grains may include catalyst material such as Co, in powder form or as deposited microstructures on the diamond grains. The Co within the substrate and potentially within the aggregation of diamond grains will melt, infiltrate into interstitial regions among the diamond grains under capillary action and promote the direct inter-growth of neighbouring diamond grains. When the pressure and temperature are decreased to ambient conditions, the Co (or alloy including Co, for example) will solidify, providing a precursor body comprising the layer of PCD material 110 joined to the substrate portion 108, from which the sensor element 100 can be formed (as used herein, ambient or atmospheric pressure is about 1.0 MPa and ambient temperature is about 20° C. to about 40° C.).

The precursor body may be substantially cylindrical, having a proximal end 102 and a distal end 104, in which the PCD layer 110 is coterminous with the proximal end 102 and the substrate portion 108 is coterminous with the distal end 104. The precursor body may be processed by grinding the PCD layer 110 to form a cutting edge 116 and, in some examples, one or more chamfer 117 adjacent the cutting edge 116. The PCD layer 110 may be treated with acid to remove Co from interstitial regions among the diamond grains within a first PCD volume 114, coterminous with the sensing or working surface 112, using a process referred to as acid leaching. After acid leaching, the interstitial regions within the first PCD volume 114 may contain no more than about 2 wt. % Co, rendering the first PCD volume 114 substantially electrically insulating. The second PCD volume 118, in which the interstitial regions are still filled with Co-containing metal, may remain non-leached and extend from an interface boundary 115 with the first PCD volume 114 to the interface boundary 106 between the PCD hard portion 110 and the substrate portion 108.

The pocket 125 for seating the first electrode 120 in the first PCD volume 114 may be formed by removing PCD material from the PCD hard portion 110, and/or by including respective recesses within the aggregation of diamond grains prior to the HPHT sintering process. If the recess for the pocket 125 is formed prior to acid leaching the PCD material, when the entire PCD layer 110 is still electrically conducting, then electro-discharge machining (EDM) techniques may be used. If the PCD layer 110 has been treated by acid leaching to remove cobalt from the first PCD volume 114, then laser machining may be used to form the recess. Similarly, through-holes for accommodating the first and second pairs of thermocouple wires 122, 132 may be provided in the aggregation of diamond grains prior to the HPHT sintering step, and/or may be formed by an EDM die-sinking process, or a laser machining process.

Once the first and second pockets 125, 135 and the associated through-holes for the pairs of thermocouple wires 122, 132 have been formed, the first electrode 120 may be seated into a respective pocket 125 and the pairs of thermocouple wires 122, 132 threaded through the through-holes. Proximal ends of each pair of the thermocouple wires may be brazed onto or into each of the first and second electrodes 120, 130 to form respective thermocouple junctions 124, 134. Each wire in a pair of thermocouple wires 122, 132 may be separately brazed to the respective electrode 120, 130 (that is, each of the pair of thermocouple wires 122, 132 may be spaced apart from each other by a surface area of the electrode 120, 130, at the thermocouple junction 124, 134), or brazed together to the electrode 120, 130 (that is, in direct electrical contact with each other via braze material).

A wide range of configurations and arrangements of the first and second electrodes 120, 130, and optionally additional electrodes (not shown), are envisaged. For example, at least one of the electrodes may be arcuate, or circumferential, or extend along part of a circumference. A second of the electrodes 130, 120 may extend at least partly, or entirely, around the first of the electrodes 120, 130. One of the electrodes 120, may be arranged at the centre of the sensing or working surface 112; a longitudinal axis of the sensor element 100 may pass through one or more of the electrodes 120, 130.

Certain terms as used herein will be briefly explained:

As used herein, "hard" material has a Knoop hardness of at least about 1000 kg·mm$^{-2}$. A hard material may include polycrystalline hard material comprising grains of hard material cemented together by a relatively softer material. Examples of hard material may include silicon carbide, silicon nitride, alumina and cemented tungsten carbide (which may be referred to as "hard-metal").

As used herein, "super-hard" material has a load-independent Vickers hardness of at least about 28 GPa; some super-hard materials may have a load-independent Vickers hardness of at least about 30 GPa, or at least about 40 GPa. As used herein, Vickers hardness is according to the ASTM384-08a standard.

Some example super-hard materials may include polycrystalline super-hard material comprising grains of super-hard material cemented together by a relatively softer material; or in which a substantial fraction of the super-hard grains are directly bonded to each other (for example, intergrown), potentially including interstitial regions between the super-hard grains. Interstitial regions may include non-super-hard filler material, and/or interstitial regions may include voids. Examples of super-hard material may include single crystal diamond, polycrystalline diamond (PCD), cubic boron nitride (cBN), polycrystalline cBN (PCBN), diamond produced by chemical vapour deposition (CVDD), or diamond grains cemented by a hard material such as silicon carbide.

A super-hard polycrystalline material may comprise an aggregation of a plurality of super-hard grains such as diamond or cBN grains, a substantial portion of which may be directly inter-bonded and may include interstitial regions among the super-hard grains. The interstitial regions may contain non-super-hard filler material such as metal in elemental or alloy form, ceramic material or intermetallic material, for example. The filler material may bind the super-hard grains together, and/or at least partially fill the interstitial regions. The content of the super-hard grains in super-hard polycrystalline material may be at least about 50 volume %, or at least about 70 volume %, or at least about 80 volume %; and/or at most about 97 volume %, or at most about 95 volume %, or at most about 90 volume % of the polycrystalline material. Some super-hard materials may consist essentially of super-hard grains.

As used herein, polycrystalline diamond (PCD) material comprises a plurality of diamond grains, a substantial portion of which are directly inter-bonded with each other or contact each other at grain boundaries. Polycrystalline diamond may consist essentially of diamond grains or include non-diamond material or voids. In some PCD material, the diamond grains may account for at least 80% of the volume of PCD material, substantially all the remaining volume being a network of interstitial regions among the diamond grains. The interstitial regions may be partly or entirely filled with diamond sintering aid material, or other filler material, or at least some of the interstitial regions may contain voids. Sintering aid for diamond may also be referred to as "catalyst material" for promoting the growth of diamond grains or the formation of diamond necks between adjacent diamond grains, under thermodynamically stable conditions for diamond. Catalyst material for diamond may also function as solvent material for carbon, and diamond sintering aid material may also be referred to as "solvent/catalyst" material. Examples of solvent/catalyst materials for diamond include iron (Fe), nickel (Ni), cobalt (Co) and manganese (Mn), and certain alloys including at least one of these elements. PCD material may be produced by subjecting an aggregation of diamond grains to an ultra-high pressure (for example, at least about 6 GPa) and a high temperature (for example, at least about 1,200° C.) in the presence of molten solvent/catalyst material. During the HPHT process, solvent/catalyst material may infiltrate through the interstitial regions among the diamond grains from an adjacent source, such as a Co-cemented tungsten carbide substrate. Consequently, PCD material may comprise or consist essentially of the inter-bonded diamond grains and interstitial regions containing Co. Some polycrystalline diamond material consisting essentially of diamond may be manufactured by a chemical vapour deposition (CVD) process.

As used herein, "electrically conductive" may include (doped or undoped) semiconductor materials, including doped wide-bandgap semiconductor materials such boron- or phosphorus-doped diamond.

As used herein, a "workpiece body" means a body, or a portion of a body, being processed by a tool to remove material from the body. For example, a workpiece may include a rock formation in the earth, or a body of raw material processed by a machine tool.

As used herein, swarf may comprise chips (or "cuttings") of material removed from a workpiece or rock formation by means of a cutter element, and/or other debris generated by a cutting or other material removal process. In various examples, swarf may consist essentially of chips, or swarf may comprise other materials present in the cutting environment, such as lubricant and/or flushing and/or cooling fluid, which may include bubbles (in other words, swarf may include one or two fluid phases). For example, swarf arising from an earth-boring process may comprise slurry material, including rock chips, fragments of rock, sand and water. Swarf may include particles of cutting tool material, arising from abrasion or erosion of the cutting tool.

As used herein, a "rake face" is a surface area of a cutter element, over which chips of workpiece material will flow, when the cutter element is used to cut a workpiece.

As used herein, an "electrode" is a conductor through which electricity enters or leaves a substance, or region or object.

The invention claimed is:

1. A sensor element for a cutting tool, comprising
a hard portion, having a first sensing surface;
a first electrode;
a first set of thermocouple wires;
a second electrode having a second sensing surface;
a second set of thermocouple wires; and
an electrically insulating portion; wherein:
the hard portion comprises hard and/or super-hard material;
the first electrode and the second electrode each comprising electrically conductive hard and/or super-hard material, the first electrode being attached to the hard portion and exposed at a first respective area of the first sensing surface;
the hard portion including the electrically insulating portion to isolate the first sensing surface from the second sensing surface;
the second electrode being attached to or forming part of an electrically conductive region of the hard portion or a further region attached thereto;
the first electrode, the second electrode and the hard portion being arranged to allow an electric current to flow between with first electrode and the second electrode through external material, when the sensing surfaces contact the external material in response to the cutting tool engaging the external material in use; wherein
the first set of thermocouple wires are electrically connected to the first electrode at a first thermocouple junction;
the second set of thermocouple wires are electrically connected to the second electrode at a second thermocouple junction; and
the first and second electrodes being operable to provide an indication of any one or more of a temperature of the first electrode and a temperature of the second electrode, and the conductivity between the first and second electrodes; and wherein
the hard portion comprises polycrystalline diamond (PCD) material and includes a surface volume that includes no more than 2 wt. % metallic material;
the first electrode being located in the surface volume; and
the hard portion comprises a second volume attached to the surface volume along an interface, the second volume comprising a metal network therethrough, the metal network comprising binder material in the second volume to bind together grains of the hard and/or super-hard material, the second volume comprising the second electrode.

2. A sensor element as claimed in claim 1, wherein the first electrode and the second electrode each comprise electrically conductive super-hard material.

3. A sensor element as claimed in claim 1, wherein the hard portion comprises super-hard material comprising any one or more of single crystal diamond, polycrystalline diamond (PCD) material, polycrystalline cubic boron nitride (PCBN) material, and/or chemical vapour deposited diamond.

4. A sensor element as claimed in claim 1, configured as a cutter element; the first sensing surface comprising a working surface including a cutting edge and providing a rake face area.

5. A sensor element as claimed in claim 1, wherein the sensor element comprises a cutter element for an earth-boring bit, or a machine tool for machining a workpiece.

6. A sensor element as claimed in claim 1, wherein the electrically insulating portion comprises a volume of the hard material portion coterminous with the first sensing surface.

7. A sensor element as claimed in claim 1, wherein the second volume comprises a cemented carbide material, the binder material comprising cobalt.

8. A sensor element as claimed in claim 1, wherein the first electrode is located in the surface volume; and the hard portion comprises a third volume attached to the second volume along a further interface; the third volume comprising a metal network therethrough.

9. A sensor element as claimed in claim 8, wherein the third volume comprises a cemented carbide material.

10. A sensor element as claimed in claim 1 wherein the second electrode is earthed.

11. A sensor assembly as claimed in claim 1, wherein the first electrode comprises boron- and/or phosphorus-doped diamond.

12. A sensor assembly comprising
a sensor element as claimed in claim 1;
a source of potential difference and electric current;
a current measurement device;
voltage measurement means connected to the first and second sets of thermocouple wires, operable to indicate the temperatures of the first and second electrodes;
the first electrode, the second electrode, the source and the current measurement device connected in an electrical circuit, arranged to generate a potential difference between the first electrode and the second electrode, and to allow an electric current to flow between the first electrode and the second electrode, through external material when the sensing surface contacts the external material in response to the cutting tool engaging the external material in use; and to allow the current measurement device to indicate the magnitude of the electric current.

13. A sensor assembly as claimed in claim 12, at least the first electrode electrically connected to the source by the first set of thermocouple wires.

14. A sensor assembly as claimed in claim 12, comprising a computer system communicatively connected to the current measurement device, to receive measured electric current data from the current measurement device; the computer system configured to process the electric current data, to determine an electrical characteristic of the external material.

15. A sensor assembly as claimed in claim 12, comprising an impedance spectrometry system, operable to process a measured electric current having one or more frequency component; the source of the electric current being configurable to generate varying electric current, having one or more frequency component.

16. A cutting tool comprising
a tool body; and
a sensor element as claimed in claim 1, attached to the tool body; operable to contact the sensing surfaces with external material when the cutting tool engages the external material in use.

17. A cutting tool as claimed in claim 16, provided as an earth-boring bit, a plurality of cutter elements attached to the bit, operable to cut rock and bore a hole into the earth;
the sensor element arranged on the earth-boring bit to allow at least an area of the sensing surface to contact rock.

18. A method of using a cutting tool as claimed in claim 16, including
engaging a workpiece body with the cutting tool to remove workpiece material from the workpiece body, and allowing the sensing surfaces of the sensor element to engage external material containing workpiece material cut from the workpiece body;
generating a potential difference between the first electrode and the second electrode;
generating an electric current to flow between the first electrode and the second electrode, through the external material contacted by the sensing surface;
measuring the electric current;
measuring the temperatures of the first electrode and the second electrode;
determining the respective electrical resistance of the first electrode and the second electrode at the respective measured temperatures; and
analysing the measured electric current to determine an electrical characteristic of the external material.

19. A method as claimed in claim 18, including a computer-implemented method to process the measured electric current, to calculate the electrical characteristic of the external material; and to calculate a quantity indicative of a mechanical characteristic of the workpiece material, based on the electrical characteristic.

* * * * *